United States Patent [19]

Oishi et al.

[11] 4,365,712

[45] Dec. 28, 1982

[54] MAGNETIC TAPE CASSETTE RECEIVING CASING

[75] Inventors: Kengo Oishi; Osamu Suzuki, both of Odawara, Japan

[73] Assignee: Fuji Photo Film Co., Ltd., Kanagawa, Japan

[21] Appl. No.: 214,163

[22] Filed: Dec. 8, 1980

[30] Foreign Application Priority Data

Dec. 19, 1979 [JP] Japan .......................... 54-175898[U]

[51] Int. Cl.³ .................... B65D 85/67; B65D 85/672
[52] U.S. Cl. ....................................... 206/387; 229/9; 229/19
[58] Field of Search ........................... 206/387; 220/8; 242/198; 229/9, 19

[56] References Cited

U.S. PATENT DOCUMENTS

| | | | |
|---|---|---|---|
| 3,900,170 | 8/1975 | Serizawa | 242/198 |
| 3,990,574 | 11/1976 | Roccaforte | 206/387 |
| 3,995,921 | 12/1976 | Ackeret | 206/387 |
| 4,058,211 | 11/1977 | Barbierl et al. | 229/19 |

*Primary Examiner*—William T. Dixson, Jr.

*Attorney, Agent, or Firm*—Sughrue, Mion, Zinn, Macpeak and Seas

[57] ABSTRACT

A case for a VTR micro cassette which fully protects the cassette against rough usage and prevents the user's fingers from touching the tape during withdrawal of the cassette from the case. The case is particularly adapted for cassettes having a rotatable cover member which is vulnerable to damage from an outside force. A shell of solid flexible material generally conforming to the cassette is provided with an opening in a side surface which corresponds to either of the side walls of the cassette but which cannot be the front surface which is covered by the rotatable cover member or the opposite rear wall. Preferably, the dimensions of the opening are made slightly greater than or equal to the corresponding outer dimensions of the side walls of the cassette while the inner dimensions in central portions and to the rear of the cassette are made slightly smaller than the outer dimensions of the cassette to retain the cassette positively in the case. An elastic retaining member can be provided to further positively retain the cassette in the casing.

5 Claims, 5 Drawing Figures

MAGNETIC TAPE CASSETTE RECEIVING CASING

BACKGROUND OF THE INVENTION

The present invention relates to a case for protecting a magnetic tape cassette.

Recently, video tape recording (VTR) systems have been developed which have been miniaturized and made light in weight due to the increased performance of video tapes used in these systems. The compactness and light weight of these video systems make them easy to carry and use outdoors.

If such a system is used outdoors, the need for protecting the video tape cassette used in the system becomes more important than when the cassettes and system are used indoors. In particular, since a micro video cassette is small in size, it is easy to handle. However, there is also an increased likelihood that such a cassette will be roughly handled. For outdoor usage of the micro video cassette, it can simply be placed in the user's pocket and carried. Further, there is an increased likelihood that the user will insert the cassette into the VTR device roughly and without insuring that the controls are properly set due to the small size of the cassette.

Because a micro video cassette is compact in size and light in weight, its components have less mechanical strength than a conventional larger cassette and thus are much more readily damaged by rough handling. For example, referring now to FIG. 1 which shows a conventional micro cassette, a rotatable cover 2 of the cassette 1 is rotatably supported by a pair of pins 3. This arrangement is mechanically weak. When an accidental force is applied thereto, there is a great possibility of breakage. The magnetic tape is disposed close to an opening on the rear side of the rotatable cover 2. Therefore, if the rotatable cover 2 is accidentally damaged, there is also a great possibility that the magnetic tape will be damaged.

In view of the above difficulties, in order to prevent damage to cassette parts and to enhance the reliability of micro cassettes, a case 20 as shown in FIG. 2 for receiving a cassette therein has been frequently used. The casing 20 is constructed in a rectangular shape corresponding to the outer configuration of the cassette 1 and has an opening 21 and cutaway portions 22. Usually, the cassette is inserted into the case 20 with the front rotatable cover 2 directed toward the case. However, the cassette is often inserted in error with the rotatable cover 2 directed rearwardly. In this case, since the rotatable cover 2 is exposed from the opening 21, an outside force may accidentally be applied to the exposed part so that the rotatable cover 2 is thereby deformed and the inner tape 2 damaged. The cover 2 in fact may be broken. A concave portion 4 is formed in the cassette at a position on the cover rear side closely corresponding to the cutaway portions 22. If the cassette is inserted into the case backwardly, when the operator goes to remove it, he is likely to push his fingers into the concave portion 4 and thereby damage the cassette.

SUMMARY OF THE INVENTION

The present invention overcomes the above noted defects inherent in the prior art micro cassette case and provides a novel case of compact size.

The above object of the present invention is attained by a case for receiving therein a substantially rectangular magnetic tape cassette which has a rotatable cover. In the case of the invention, an opening is formed in a side surface of the cassette case with the side surface corresponding to either of the magnetic tape cassette side walls but not the front surface which is covered with a rotatable cover or the rear wall which is directly opposite the front surface. The inner dimensions of the opening are preferably equal to or slightly greater than the corresponding outer dimensions of the cassette while the inner dimensions of the cassette case at a transverse surface at a position beyond the opening in central portions of the cassette are slightly smaller than the outer dimensions of the cassette case. Further, an elastic retaining member can be provided which is pressingly engageable with the cassette disposed on an inner surface of the casing.

DESCRIPTION OF THE PREFERRED EMBODIMENTS

Figure 1:
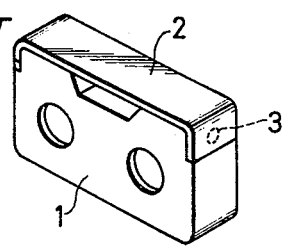
FIG. 1 is a perspective view of a conventional micro video tape cassette.
Figure 2:
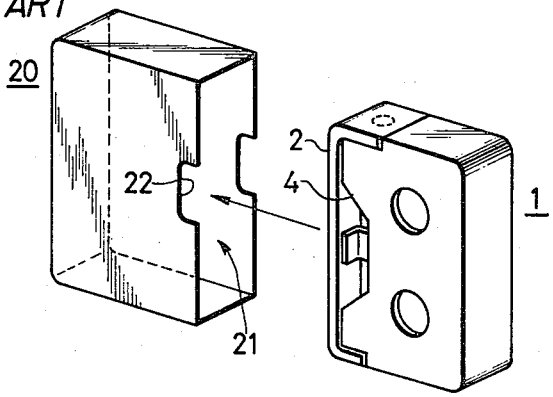
FIG. 2 is an illustration of a prior art cassette case.
Figure 3:
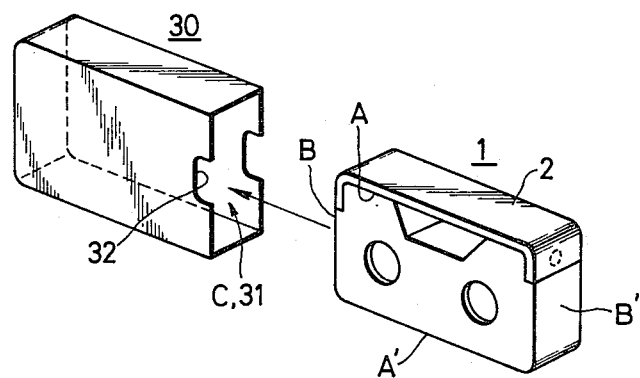
FIG. 3 is an illustration of a cassette receiving case according to the present invention.

A preferred embodiment of a case for a magnetic tape micro video cassette according to the present invention will now be described with reference to the accompanying drawings. FIG. 3 is a perspective view showing a case 30 constructed according to the present invention together with a cassette 1.

The cassette case 30 is substantially rectangular conforming to the shape of the cassette 1. The outer casing 30 has an open side surface C which corresponds to a side wall B or B' of the cassette 1 which cannot be the front surface A where the rotatable cover 2 is located or the rear surface A' which is directly opposite the surface A. The side opening 31 serves as a case inlet and outlet opening. A pair of cutaway portions 32 are formed in the upper and lower edge portions of the case 30 for ease of cassette withdrawal.

With this construction, even if the insertion direction of the cassette is reversed, the cover 2 is not exposed outside the cassette case 30 and vulnerable parts of the cassette are always covered by the case 30 when received. For this reason, the cover 2 and the magnetic tape are completely protected from damage.

Figure 4:
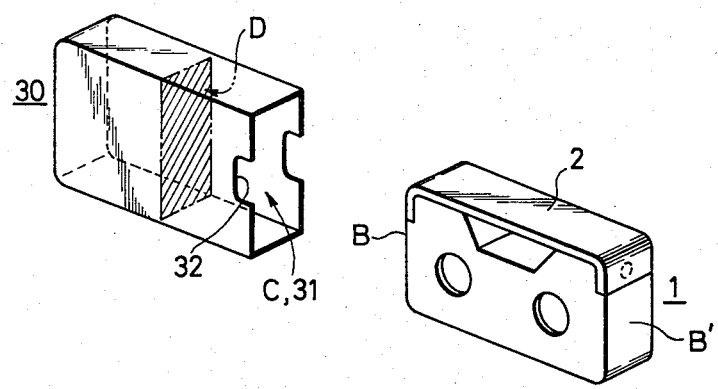
FIGS. 4 and 5 are perspective views of modifications of the case of the present invention.

If the inner dimension of the cassette receiving case 30 is made somewhat greater than the outer dimension of the cassette 1, it is easy to withdraw the cassette 1 therefrom without the need of the cutaway portions 32. However, this may lead to the cassette falling out of the case 30. Accordingly, referring now to FIG. 4, if the dimensions of the transverse surface D positioned inside of the opening 31 in center portions of the case are made slightly smaller than the outer dimensions of the side surface B or B' of the cassette 1, the cassette 1 will be retained in the case 30 by the slight pressure generated therebetween.

A material having a slight flexibility is suitable for the receiving case 30, for example, polypropylene.

Figure 5:
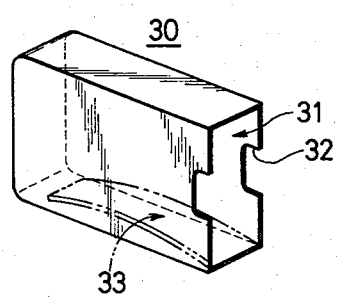

It is also possible to provide an elastic member 33 on one of the inner surfaces of the case 30 as shown in FIG. 5 to thereby pressingly retain the cassette.

The cassette receiving casing according to the present invention has the following advantages.

(1) The rotatable cover which is very weak mechanically is positively protected to enhance the protection of the cassette when it is carried.

(2) The cover and the cassette concave portions where the magnetic tape can easily be contacted are fully protected.

(3) If a cassette retaining member is provided, the cassette is even more positively retained in the case to thus prevent the cassette from falling out of the case.

It is clear that the present invention can be applied not only to micro video cassettes but to other video or acoustic tape cassettes as well.

What is claimed is:

1. A storage case for receiving and protecting a substantially rectangularly shaped cassette having a rotatable cover member comprising, a shell of solid flexible material conforming to the shape of said cassette, an opening being formed in a side surface of said storage case, said side surface corresponding to either of side walls of said cassette except for a front surface covered by said rotatable cover member and a rear wall directly opposite said front surface, and inner dimensions of a transverse surface in central portions of said case inside said opening being slidably smaller than the outer dimensions of the side walls of said cassette to hold said cassette inside said storage case.

2. The storage case according to claim 1 wherein inner dimensions of said opening are equal to or slightly greater than corresponding outer dimensions of said side walls of said cassette.

3. The storage case according to claim 1 or 2 further comprising an elastic retaining member pressingly engageable with said cassette disposed on an inner surface of said case inside said opening.

4. The storage case according to claim 1 or 2 wherein said case is provided with cutaway portions on opposite sides of said opening.

5. The storage case according to claim 1 or 2 wherein said case is fabricated from polypropylene.

* * * * *